March 7, 1967 S. E. ROHOWETZ ETAL 3,308,419

POWER SUPPLY MEANS

Filed April 27, 1964

Inventors
Stanley E. Rohowetz
Cyril D. Shallow
By Thomas F. Kirby
Attorney

United States Patent Office 3,308,419
Patented Mar. 7, 1967

3,308,419
POWER SUPPLY MEANS
Stanley E. Rohowetz, Elm Grove, and Cyril V. Shallow, West Allis, Wis., assignors to Allis-Chalmers Manufacturing Company, Milwaukee, Wis.
Filed Apr. 27, 1964, Ser. No. 362,874
11 Claims. (Cl. 339—147)

This invention relates generally to electrical power supply replacement means for dry cell batteries in battery powered devices such as tools, appliances, electrical instruments and toys.

More particularly, it relates to a contactor to replace a battery in such devices to facilitate the connection thereto of wire leads from a power supply source.

The useful life of dry cell batteries in such devices is relatively short when they are subjected to heavy use and the matter of battery replacement is annoying, inconvenient and costly. The nature of some of these devices, toys in particular, is such that it is possible to power them from a low voltage direct current power supply source other than batteries. Such power supply sources or powerpacks are available on the market in the form of a unit comprising, for example, a transformer operable on household current, one or more rectifiers to provide a direct current output, and a rheostat to regulate the voltage output. However, since the device to be powered therefrom has battery holding means including terminals which are especially adapted to accommodate dry cell type batteries, it is not always practical or convenient to connect the output leads from the power supply unit directly to the terminals of the battery holding means. In fact it is difficult if not impossible for persons lacking mechanical aptitude or for children to make such connections in some devices.

Accordingly, it is an object of the present invention to provide improved means for connecting a low voltage direct current power supply source to the terminals of a battery holding means in a battery operated device.

Another object is to provide means of the aforesaid character comprising a cell member or contactor which resembles a dry cell battery in size and general configuration and which is adapted for electrical connection to a low voltage direct current power supply source and for insertion in the battery holding means of a device to electrically connect the source to the device.

Another object is to provide a cell member or contactor of the aforesaid character which can be used singly in a device having a battery holding means requiring one dry cell battery or can be used in combination with one or more similar contactors in battery holding means adapted to accommodate a plurality of dry cell batteries.

Other objects and advantages of this invention will hereinafter appear.

The accompanying drawing illustrates preferred embodiments of the invention but it is to be understood that the embodiments illustrated are susceptible of modifications with respect to details thereof without departing from the scope of the appended claims.

Figure 1:
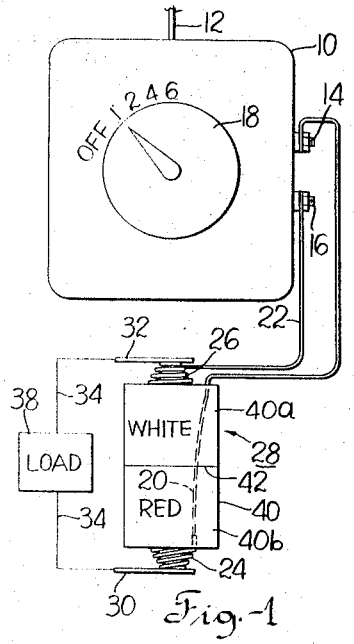
FIG. 1 is a diagrammatic showing of a low voltage direct current power supply source connected to the battery holder of a device by means of single cell member or contactor constructed in accordance with the present invention.

Referring to FIG. 1, the numeral 10 designates a known type of power supply unit which is adapted for connection to a source of 110 volt alternating current by means of a line cord 12. Unit 10 is understood to comprise a stepdown transformer which has a rectifier means and a rheostat in circuit with its secondary winding to provide a supply of low voltage direct current across its output terminals 14 and 16. Unit 10 is provided with a rheostat control knob 18 to provide a variable output voltage ranging, for example, from zero to six volts across its output terminals 14 and 16.

Unit 10 serves as a power supply source for an electrical device which FIG. 1 shows as comprising a battery holder having a pair of load terminals 30 and 32, a load 38, and suitable electrically conductive means 34 and 36 between the load terminals 30 and 32, respectively, and the load. It is to be understood that the battery holder normally would accommodate a single dry cell between its load terminals 30 and 32.

In accordance with the present invention, instead of a dry cell, the battery holder of FIG. 1 is shown as accommodating a single contactor or cell member 28 constructed according to the present invention. As will be understood, the battery holder means comprising the terminals 30 and 32 is representative of similar means found in battery operated devices and could take some other form provided it affords physical support for the contactor 28 and makes electrical contact with the terminals thereof.

Referring to FIGS. 1 through 5, it is seen that contactor 28 comprises a case or member 40 made of electrical insulating material such as plastic, which is understood to be approximately the same size as a dry cell battery which it is intended to replace. In the embodiment shown, case 40 is cylindrical in form and for convenience of manufacture and assembly and for cost reduction is hollow, being fabricated in two sections 40a and 40b. Preferably, the sections 40a and 40b of case 40 are identical in size and shape and are joined together at 42 by a suitable adhesive or plastic cement. For ease of polarity identification it is desirable to mark each end of contactor 28 to distinguish it from the other. This can be done by making sections 40a and 40b of different colored material, as shown in FIG. 1, wherein section 40a is indicated as being white and section 40b as red. Such marking aids in determining polarity if this is a factor in particular devices using the connector.

Figure 5:
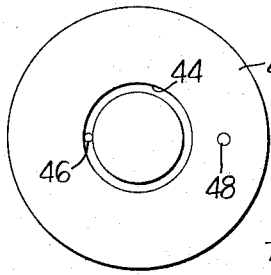
FIG. 5 is a view similar to FIG. 3 but shows the end of the casing with one of its contacts removed.
Figure 4:
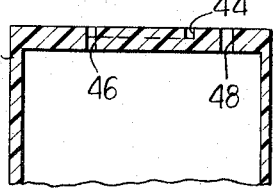
FIG. 4 is a showing of a portion of the casing of the contactor shown in FIGS. 2 and 3 with one of its contacts removed.

Case 40 of contactor 28 is further provided with means for supporting the pair of electrical contacts 24 and 26, thereon. Thus, as FIGS. 4 and 5 show, section 40a is provided on its flat end surface or side with an annular groove or depression 44 which is adapted to accommodate the endmost convolution of contact 26. A hole 46 in the bottom of depression 44 communicates with the hollow interior of case 40 and is adapted to accommodate the depending end of contact 26 which extends into case 40.

Figure 2:
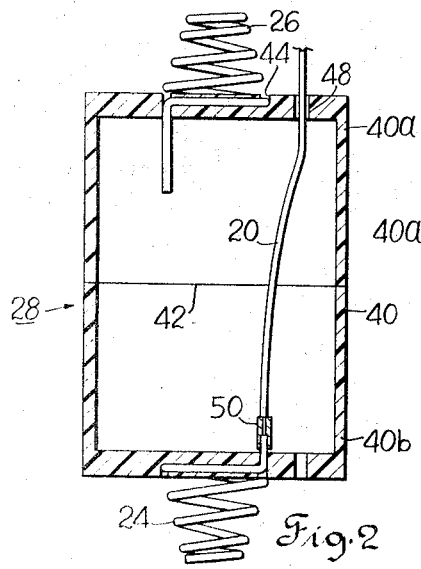
FIG. 2 is an enlarged sectional view of the contactor shown in FIG. 1.

Section 40a of case 40 is also provided on its flat end surface with a hole 48 which extends therethrough for accommodating wire lead 20, as shown in FIG. 2.

As FIG. 2 shows, section 40b of case 40 has the same configuration as section 40a.

Figure 6:
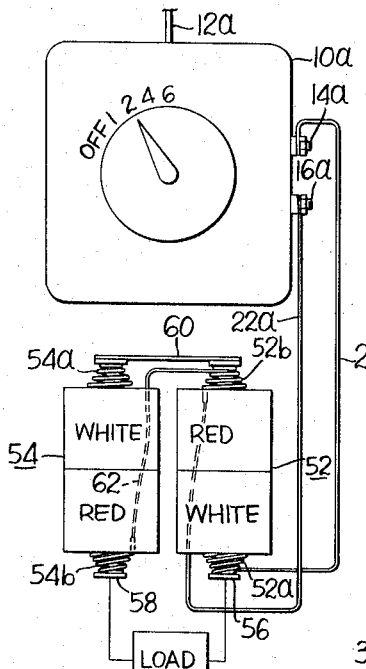
FIG. 6 is similar to FIG. 1 but shows two contactors arranged in side-by-side relationship in a battery holder.
Figure 7:
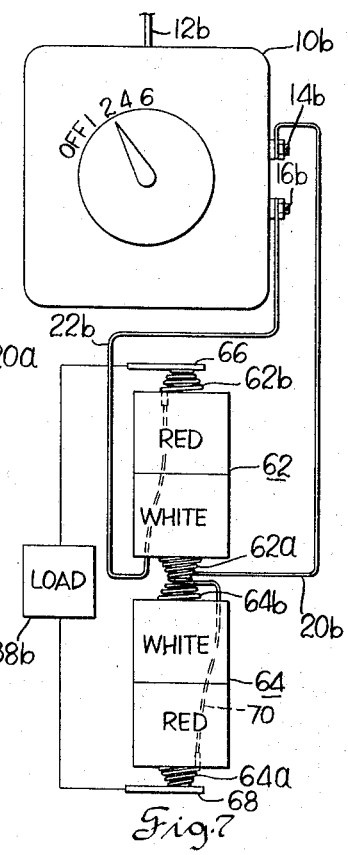
FIG. 7 is similar to FIG. 6 but shows two contactors arranged in end-to-end relationship in a battery holder.
Figure 3:
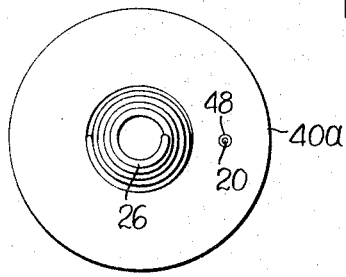
FIG. 3 is an end view of the contactors shown in FIG. 2.

The contacts 24 and 26 of contactor 28 are located at opposite ends of casing 40. Each contact 24 and 26 is adapted for electrical connection to a battery holder terminal and to a contact on a similar form of contactor, as shown in FIGS. 6 and 7. Each contact 24 and 26 is frictionally attached to casing 40, this feature being desirable from the standpoint of contact fabrication and assembly of the contactor. Contact 26, for example, is in the form of a spirally wound electrically conductive resilient member which can be compressed nearly flat against the end of casing 40, if need be. Contact 26 is mechanically secured to casing 40 by having a convolution thereof fit into annular groove 44 formed in the end of the casing. One end of contact 26 is bent to form a depending portion which extends into hole 46 which is provided in groove 44 in casing 40. The depending portion of contact 26 aids in securing the contact more firmly to casing 40.

As FIG. 2 shows, contact 24 is similar in configuration and mounting to contact 26.

As FIGS. 1 and 2 show, contactor 28 comprises a wire lead 20 which extends through hole 48 in one end of casing 40 of contactor 28 and is permanently connected on the inside thereof at one end by a clip 50 to the inwardly projecting end of contact 24. Wire lead 20 of contactor 28 is connected to output terminal 14 of power supply unit 10. Wire lead 22 from terminal 16 of power supply unit 10 is shown as being connected directly to contact 24 of contactor 28 exteriorly of the latter merely by entrapment in the convolutions thereof.

As FIG. 1 shows, connector 28 acts to make an electrical connection between the output terminal 14 and 16 of power supply unit 10 and the battery holder load terminals 30 and 32, respectively, thereby affording a means for energizing load 38. The resiliency of the contacts 24 and 26 of connector 28 assures good electrical contact between them and their respective battery holder terminals and also serves to help maintain contactor 28 in place in the battery holder.

Referring now to FIG. 6, two contactors 52 and 54 which are understood to be similar to connector 28 hereinbefore described are arranged in a battery holder in side-by-side relationship. The battery holder of FIG. 6 comprises two load terminals 56 and 58 and a common terminal 60. As FIG. 6 shows, a wire lead 20a from a power supply unit 10a is electrically and mechanically connected to a contact 52a of contactor 52 which, in turn, is electrically connected to load terminal 56 of the battery holder. A wire lead 22a from contact 52b of contactor 52 is electrically connected to contact 16a of power supply unit 10a. Contact 52b of contacts 52 is electrically connected to common terminal 60 of the battery holding means. Contacts 54a and 54b of contactor 54 are connected to common terminal 60 and load terminal 58, respectively, of the battery holding means. A lead wire 62 from contact 54b of contactor 54 is electrically and mechanically connected to contact 52b of contactor 52. Thus, means are provided for electrically connecting the terminals 14a and 16a of power supply unit 10a to load 38a.

Referring to FIG. 7, two contactors 62 and 64 which are understood to be similar to connector 28 hereinbefore described are arranged in a battery holder in end-to-end relationship. The battery holder of FIG. 7 comprises a pair of load terminals 66 and 68. A wire lead 20b from an output terminal 14b of a power supply unit 10b is electrically and mechanically connected to a contact 62a of contactor 62 which, in turn, is electrically connected by spring pressure to a contact 64b of contactor 64. A contact 62b of contactor 62 is electrically connected to load terminal 66. A lead wire 22b from contact 62b of contactor 62 is connected to output terminal 16b of power supply unit 10b.

Contact 64a of contactor 64 is electrically connected to load terminal 68. A wire lead 70 from contact 64a of contactor 64 is electrically connected to contact 64b of contactor 64. Thus, means are provided for electrically connecting the output terminals 14b and 16b of power supply unit 10b to a load 38b.

As will be apparent, two or more contactors such as 28 may be assembled in various combinations other than those shown in FIGS. 6 and 7 to suit the requirements of a particular type of battery holding means whose batteries are to be replaced.

Figure 8:
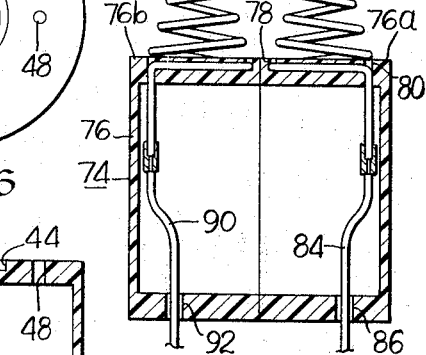
FIG. 8 is a sectional view of another type of contactor embodying the invention.

FIG. 8 shows a contactor 74 which is adapted to replace a well-known rectangular type of dry cell. Contactor 74 comprises a case 76 of insulating material which is fabricated in two identical sections 76a and 76b. Section 76a, for example, is provided with contact mounting means such as an annular groove 78 and hole 80 similar to those described in connection with contactor 28 for accommodating a contact 82. Contact 82 is similar to terminal 26 hereinbefore described. A wire lead 84 is electrically and mechanically connected to contact 82 and extends from case 76 through a hole 86 in the bottom of case 76. Contactor 74 is further provided with another contact 88 which is mounted on section 76b of case 76 and is similar in all respects as to configuration and mounting as contact 82. Contact 88 is provided with a wire lead 90 which extends from case 76 through a hole 92 in the bottom of case 76.

In use, contactor 74 is placed in a suitable type of battery holder and its wire leads 84 and 90 are connected to the output terminals of a power supply unit such as the unit 10 hereinbefore described.

The embodiments of the invention in which an exclusive property or privilege is claimed are defined as follows:

1. In a contactor for substitution for a dry cell battery in a battery holder of an electrical device which is to be energized from a power supply source, in combination, an insulating case, and a pair of electrically conductive contacts mounted on said case and adapted to make electrical contact with a pair of terminals of said battery holder, said contacts being further adapted to have electrical wire leads from said power supply source connected thereto, wherein both said contacts are mounted on one side of said case.

2. In a contactor for substitution for a dry cell battery in a battery holder of an electrical device which is to be energized from a power supply source, in combination, an insulating case, said case having a pair of contact receiving grooves provided on the exterior thereof, and a pair of resilient electrically conductive contacts mounted on said case, each contact being retained by entrapment in one of said annular grooves and each contact adapted to have a wire lead detachably connected thereto exteriorly of said case, wherein a portion of at least one contact extends into said case and including at least one wire lead which is permanently connected to said contact portion of said case and extends through said case and out a side thereof other than the side on which said one contact is mounted.

3. In a contactor for substitution for a dry cell battery in a battery holder of a device which is to be energized from a power supply source, in combination, a hollow insulating case, said case having a wire receiving opening through at least one side thereof communicating with the hollow interior of said case, a pair of contacts mounted on said case, at least one of said contacts being mounted on a side of said case other than said one side thereof and having a portion extending into the hollow interior of said case, and a wire lead extending through said wire receiving opening into said case and electrically and mechanically connected to said portion of said one contact.

4. In a contactor for substitution for a dry cell battery in a battery holder of a device which is to be energized from a power supply source, in combination, a hollow insulating case, said case comprising two separate sections which are secured together, each section being provided with a wire receiving opening, a pair of contacts mounted on said case, each contact being mounted on one section of said case and each contact having a portion extending into the hollow interior of said case, and at least one wire lead extending through one of said wire receiving openings of said case and being permanently connected to a portion of one of said contacts within said case.

5. In a contactor for substitution for a dry cell battery in a battery holder of a device which is to be energized from a power supply source, in combination, a hollow insulating case comprised of two separate sections which are secured together, each section being provided with a wire receiving opening and being further provided with an annular groove on an exterior surface and having an opening, said groove communicating with the hollow interior of said case, a pair of contacts mounted on said case, each contact being formed of a helically shaped member having a projecting end portion, each contact being retained on one section of said case by having its projecting end portion extend through said opening in said groove and by having one convolution entrapped in said groove, and at least one wire lead extending through one wire receiving opening in said case and being permanently attached to the projecting end portion of one of said contacts.

6. The combination according to claim 5 wherein said case is cylindrical in form and has a pair of substantially flat end walls, each of which end wall is provided with one annular groove, an opening in said groove, and a wire receiving opening through said wall at a point outside of said groove.

7. The combination according to claim 5 wherein said case is a polyhedron having six substantially flat major sides, wherein both of said annular grooves and the openings in each of said grooves are located on one of said six sides, and wherein said wire receiving openings are located other than on said one of said six sides.

8. In combination, a source of electrical power, an electrical device having a dry cell battery holder for accommodating at least two batteries in side-by-side relationship, said battery holder having first and second load terminals and a third common terminal, first and second contactors in said battery holder in side-by-side relationship, each contactor having a case and first and second contacts mounted thereon, said first and second contacts of said first contactor being in electrical contact with said first load terminal and said third terminal of said battery holder, respectively, said first and second contacts of said second contactor being in electrical contact with said third terminal and said second terminal of said battery holder, respectively, a pair of wire leads for electrically connecting each of said contacts of said first contactor to said source of power, and a third wire lead for electrically connecting said second contact of said second contactor to said second contact of said first contactor.

9. The combination according to claim 8 wherein at least one of said pair of wire leads and said third wire lead are peermanently connected to their associated contacts.

10. The combination according to claim 8 wherein at lead are permanently connected to their associated conlead are permanently connected to their associated contacts.

11. In combination, a source of electrical power, an electrical device having a dry cell battery holder for accommodating at least two batteries in end-to-end relationship, said battery holder having first and second load terminals, first and second contactors in said battery holder in end-to-end relationship, each contactor having a case and first and second contacts mounted thereon, said first contacts of both contactors being in electrical contact with each other, said second contacts of said first and second contactors being in electrical contact with said first and second terminals of said battery holder, respectively, a pair of wire leads for electrically connecting each of said contacts of said first contactor to said source of power, and a third wire lead for electrically connecting said first and second contacts of said second contactor to each other.

References Cited by the Examiner
UNITED STATES PATENTS 3,201,742    8/1965    English _____ 320—2 X
3,209,230    9/1965    Mas _____ 320—2

JOHN F. COUCH, *Primary Examiner.*

S. WEINBERG, *Assistant Examiner.*